United States Patent
Leijtens et al.

(10) Patent No.: US 10,324,261 B2
(45) Date of Patent: Jun. 18, 2019

(54) MULTI-PORT OPTICAL PROBE FOR PHOTONIC IC CHARACTERIZATION AND PACKAGING

(71) Applicant: Technische Universiteit Eindhoven, Eindhoven (NL)

(72) Inventors: Xaverius Jacques Maria Leijtens, Eindhoven (NL); Rui Manuel Lemos Álvares dos Santos, Eindhoven (NL)

(73) Assignee: Technische Universiteit Eindhoven, Eindhoven (NL)

( * ) Notice: Subject to any disclaimer, the term of this patent is extended or adjusted under 35 U.S.C. 154(b) by 0 days.

(21) Appl. No.: 15/551,674

(22) PCT Filed: Feb. 18, 2016

(86) PCT No.: PCT/EP2016/053429
§ 371 (c)(1),
(2) Date: Aug. 17, 2017

(87) PCT Pub. No.: WO2016/131906
PCT Pub. Date: Aug. 25, 2016

(65) Prior Publication Data
US 2018/0024299 A1     Jan. 25, 2018

Related U.S. Application Data

(60) Provisional application No. 62/117,757, filed on Feb. 18, 2015.

(51) Int. Cl.
*G02B 6/30* (2006.01)
*G02B 6/14* (2006.01)
(Continued)

(52) U.S. Cl.
CPC ............... *G02B 6/30* (2013.01); *G02B 6/14* (2013.01); *G02B 6/264* (2013.01); *G02B 6/366* (2013.01);
(Continued)

(58) Field of Classification Search
None
See application file for complete search history.

(56) References Cited

U.S. PATENT DOCUMENTS 5,054,870 A * 10/1991 Losch .................. G02B 6/43
                                                      250/227.24
5,252,823 A * 10/1993 Doty .................. G02B 6/4207
                                                      250/227.24
(Continued)

FOREIGN PATENT DOCUMENTS

EP            2746828         6/2014

OTHER PUBLICATIONS

Peters et al. "Suspended photonic waveguide arrays for submicrometer alignment", 2014, PROC SPIE v9133 pp. 913317-1 to 913317-10.
(Continued)

*Primary Examiner* — Michael Stahl
(74) *Attorney, Agent, or Firm* — Lumen Patent Firm

(57) ABSTRACT

Improved passive optical coupling to photonic integrated circuit (PIC) chips is provided. An interposer unit (108) having one or more flexible optical waveguide members (112, 114, 116) is employed. The flexible optical waveguide members are coupled to the PIC chip (118) via their tips. The PIC chip includes alignment features to facilitate lateral, vertical and longitudinal passive alignment of the flexible optical waveguide members to on-chip optical waveguides of the PIC.

17 Claims, 10 Drawing Sheets

(51) Int. Cl.
G02B 6/26 (2006.01)
G02B 6/36 (2006.01)
G02B 6/42 (2006.01)

(52) U.S. Cl.
CPC ............ *G02B 6/4274* (2013.01); *G02B 6/305* (2013.01); *G02B 6/368* (2013.01)

(56) References Cited

U.S. PATENT DOCUMENTS

| | | | |
|---|---|---|---|
| 5,375,184 A * | 12/1994 | Sullivan | G02B 6/10 385/129 |
| 6,238,100 B1 * | 5/2001 | Sasaki | G02B 6/421 385/59 |
| 6,356,692 B1 | 3/2002 | Ido | |
| 6,925,238 B2 | 8/2005 | Lee et al. | |
| 7,738,753 B2 | 1/2010 | Assefa et al. | |
| 8,442,368 B1 | 5/2013 | Reano et al. | |
| 2002/0085817 A1 * | 7/2002 | Ukechi | G02B 6/3582 385/89 |
| 2002/0126962 A1 * | 9/2002 | Kadar-Kallen | G02B 6/423 385/24 |
| 2002/0181882 A1 * | 12/2002 | Hibbs-Brenner | G02B 6/26 385/52 |
| 2003/0007741 A1 | 1/2003 | Ollier | |
| 2010/0220957 A1 * | 9/2010 | Asahi | G02B 6/423 385/39 |
| 2011/0222815 A1 | 9/2011 | Hamana | |
| 2013/0251304 A1 | 9/2013 | Barwicz | |

OTHER PUBLICATIONS

Sun, "Free-standing integrated optics in silicon", 2012, Ph.D. dissertation.

\* cited by examiner

MULTI-PORT OPTICAL PROBE FOR PHOTONIC IC CHARACTERIZATION AND PACKAGING

CROSS-REFERENCE TO RELATED APPLICATIONS

This application is a 371 of PCT/EP2016/053429 filed on Feb. 18, 2016. of PCT/EP2016/053429 filed on Feb. 18, 2016 claims the benefit of U.S. Provisional Application 62/117,757 filed on Feb. 18, 2015.

FIELD OF THE INVENTION

This invention relates to optical coupling to a photonic integrated circuit chip.

BACKGROUND

Coupling optical fibers to a photonic integrated circuit (PIC) chip is a difficult task, especially for multiple fiber connections at once. This is because the size of the optical field inside the PIC waveguides is on the order of a micron, which means that the fiber connection needs to be positioned with sub-micron precision in three dimensions to achieve an optimal coupling. For attachments of one or two fibers to a single PIC output/input waveguide, there are standard methods, which are undesirably costly. However, no good, reliable and cheap solutions exist to attach multiple fibers to a PIC chip.

Multiple fiber-chip couplings have been carried out so far by using a lensed fiber array that is accurately aligned to the outputs of the PIC chip and then fixed and possibly fine-adjusted after fixing. This is difficult and costly and the precision with which fiber arrays are fabricated is on the order of a micron, and reaching sub-micron precision requires careful selection of individual fibers. Another method uses a lens-array for beam expansion. Careful alignment of a second lens-array is needed. Both methods require "active alignment" where light is generated or detected on the PIC chip and the optical coupling is optimized by maximizing the coupled optical power to the optical fiber arrays. Passive alignment is a simpler process where parts are aligned without illuminating them and optimizing optical signals.

It would be an advance in the art to provide high-performance optical coupling to a PIC chip using passive alignment.

SUMMARY

This work provides a solution to this problem that can optically couple a large number of fibers (or other optical components) to a chip with sub-micron longitudinal, lateral and vertical alignment tolerances and which requires only an initial passive alignment of a few microns, which can be achieved passively with state-of-the-art industrial equipment. This allows for a fully automated assembly. In addition, this approach can be used to provide on-wafer probing of optical signals, thereby enabling wafer-level testing of optical signals. Optical testing of PIC chips in an early fabrication stage (before dicing or cleaving) is a highly desirable feature and is currently not available, except for membrane type waveguides where a grating coupler can be used.

The main principle of this work is to use an interposer that connects easily to, on the one side, one or more standard optical fibers (or other optical components), and, on the other side, to the PIC chip. The connection from the interposer to the optical fibers is an established technology, where the size of the optical fields is matched. The connection to the PIC chip is provided by a number of long and thin flexible optical waveguide members (sometimes referred to as "fingers" herein) that are typically defined by lithography where each contains a waveguide for guiding the optical field. These fingers are fabricated in the interposer material that has both waveguiding properties as well as the mechanical properties for giving them the required flexibility. In the same material the light-guiding waveguides can be routed to an optical fiber array. In the interposer, between the fingers and the fibers, the optical field can be expanded in such a way that the expanded waveguides attach with a much relaxed tolerance to the optical fiber array. In this way this structure can act as a size adapter between the fiber array and the PIC chip.

Typically, waveguides are made in the top few microns of a light-guiding material that is grown or deposited on a substrate. This substrate often is silicon. By removing the substrate that is below the fingers, these fingers become free-hanging cantilever structures with typical lengths from 500 microns to 1.5 mm and around 10×10 microns in cross section. By fully removing the substrate that is below the fingers, the fingers become visible both from top and bottom of the interposer structure, which may aid in the alignment and provides the space for the fingers to move.

For positioning the fingers on the PIC chip and aligning the waveguides, a landing region on the PIC chip provides mechanical guidance of the fingers to the correct position for creating the optical connection between the interposer and the PIC chip. Permanent fiber-chip coupling via the interposer can be provided by affixing the fingers into position permanently. Alternatively, the interposer can act as an optical probe head, and be used to do on-wafer optical characterization via temporary optical connections, before cleaving out the separate chips from the wafer.

By adding a metal layer on top of the flexible fingers, and doing the same either on or adjacent to the landing region, these structures can provide the capability to simultaneously do optical testing and electrical testing. This can be either through the same finger that would then guide both the optical and the electrical signals, independently, or it could be in a separate set of fingers that are dedicated for the electrical connections.

This interposer approach provides significant advantages:

1) It allows accurate passive alignment between a PIC chip and one or more other optical components. In the PIC chip a landing region is defined that facilitates the mechanical alignment of the flexible fingers to the waveguides on the PIC chip. The dimensions of the PIC waveguides, the landing region and the flexible fingers can be chosen such that the alignment of the optical modes is provided by mechanical engagement. The required fabrication tolerance is well within the current capabilities.

2) It shortens the tolerance chain that adds various error sources to the final alignment accuracy. Since there is a direct landing of the fingers on the alignment features, this provides the shortest possible tolerance chain between interposer and PIC chip.

3) It provides a high-density optical connection to the PIC. Because the fingers can be small, the pitch can be small as well (e.g. on the order of 25 microns). This is 5 to 10 times more dense than the standard optical fiber array, which has a typical pitch of 127 or 250 microns. The interposer can bridge this pitch mismatch. For example, a connection with 64 fingers at 25 micron pitch is only 1.6 mm wide.

4) A problem with traditional methods is in the difference of thermal expansion of the multiport optical coupling and the PIC chip, leading to temperature-dependent alignment, or stress in the materials. Because the fingers are flexible, they will not suffer from a thermal expansion mismatch.

5) Because of the flexibility of the fingers, it is not necessary to use them all. For example, one could have a standard 64 finger interposer and use only 10 fingers to actually connect to on-chip waveguides. The other fingers could be left floating, which would not create any problems or mechanical damage due to the flexibility of the fingers.

6) The light travelling in most PIC chips is kept in-plane and will be coupled out from the edge of the samples. Traditionally, to characterize the performance of the circuits, the PIC chips must first be cleaved or diced from the wafer and then have the optical input/output coupled to an optical fiber for testing. However, with the present approach, light can be coupled to or from a PIC chip in a wafer without the need to cleave the wafer into individual chips. Instead, waveguide end faces are formed by etching. As described in greater detail below, these etched end faces can be angled to reduce reflection.

7) Having the interposer in a low-loss material allows one to take advantage of additional (optical) functions on the interposer, e.g. polarization modification, optical isolation, wavelength multiplexing, wavelength demultiplexing, wavelength-selective routing, wavelength-selective switching, interferometry, switching, providing resonance with one or more ring resonators, providing optical delays, splitting and combining, etc.

8) It can provide simultaneous optical and electrical testing capabilities.

The method is not necessarily limited to in-plane outcoupling. A similar method can be used to connect to out-of-plane grating couplers, where in this case, the main advantage is in the reduced pitch, compared to fiber arrays.

For in-plane on-wafer optical probing there are no real solutions available with conventional technology. For in-plane on-wafer probing, the PIC waveguides and landing regions of this work can be designed in such a way that the waveguides used for on-wafer probing are the same that will be used for final alignment, once the chips are cleaved/diced from the wafer.

DETAILED DESCRIPTION

Figure 1A:
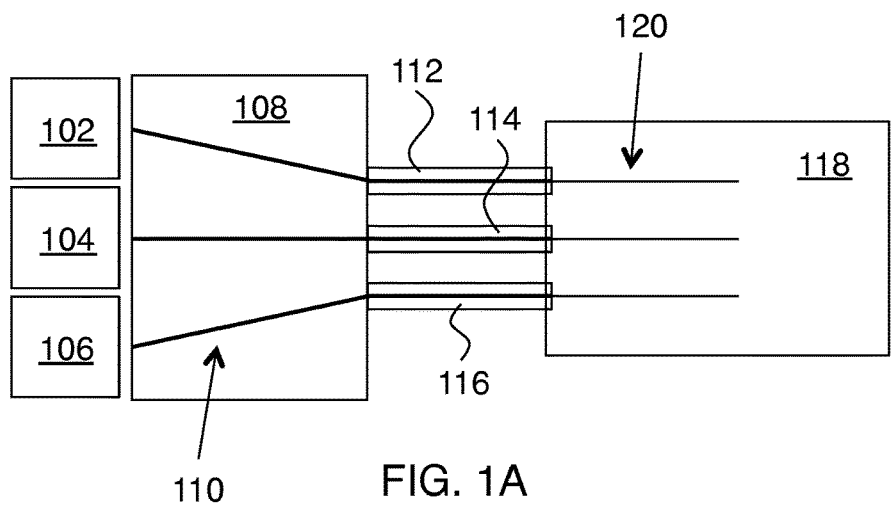
FIGS. 1A-C show several top views of embodiments of the invention.

FIG. 1A is a top view of an exemplary embodiment of the invention. In this example, several optical fibers 102, 104, and 106 are optically coupled to a photonic integrated circuit chip 118 via an interposer unit 108. Interposer unit 108 includes one or more flexible optical waveguide members, referenced here as 112, 114, and 116. The flexible optical waveguide members each include an optical waveguide. These waveguides are shown here with heavy black lines and are referenced as 110. The flexible optical waveguide members are configured to optically couple between on-chip optical waveguides 120 of PIC chip 118 and interposer unit 108 via tips of the flexible optical waveguide members, as shown.

Figure 1B:
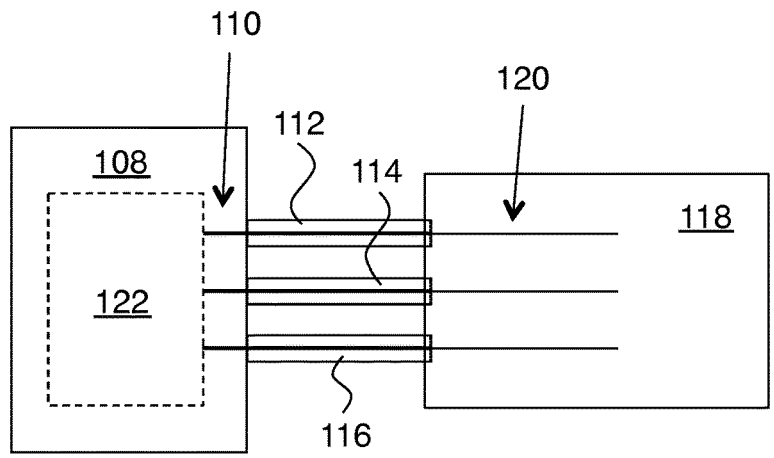

In the example of FIG. 1A, the interposer unit provides the function of matching the pitch (i.e., the fiber to fiber spacing) of the array of fibers 102, 104 and 106 to the pitch of on-chip optical waveguides 120. Practice of the invention does not depend critically on which other functions (if any) are implemented in the interposer unit in addition to providing optical coupling to the PIC chip. FIG. 1B shows inclusion of a generic functional block 122 in interposer unit 108. Functions that can be provided by interposer unit 108 include but are not limited to: polarization modification, optical isolation, wavelength multiplexing, wavelength demultiplexing, wavelength-selective routing, wavelength-selective switching, switching, interferometry, providing resonance with one or more ring resonators, providing optical delays, splitting and combining.

Figure 1C:
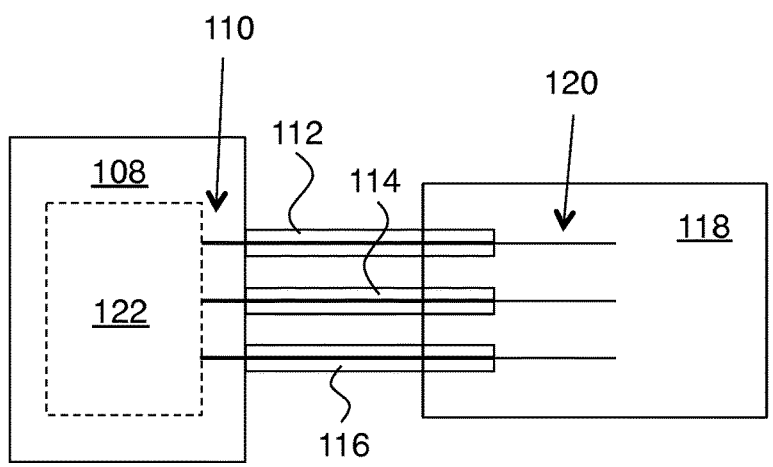

The examples of FIGS. 1A and 1B show optical coupling at or near the edge of the PIC chip. However, this is not necessary for practicing the invention. As will be seen in greater detail below, access to an edge of the PIC chip is not necessary. Optical coupling according to principles of the invention can be made in mid-chip and more significantly in mid-wafer (e.g., in testing, prior to dicing a wafer of fabricated photonic integrated circuits into individual PIC chips). FIG. 1C schematically shows this possibility.

In one exemplary design, the interposer unit had a size of 5×5 mm and had 32 optical inputs/outputs (I/O). On the fiber side, a 32 fiber array unit with a pitch of 127 µm could be attached. On the other side of the chip the pitch was 50 µm which is compatible with the high density optical I/O of InP or Si PIC chips. Practice of the invention does not depend critically on the materials used for the PIC chips. Suitable materials include, but are not limited to: InP, Si, GaAs, oxides, and nitrides. Interposer unit designs with 25 µm pitch on the PIC chip side have also been made. Other cell designs have been made with different numbers of optical inputs/outputs ranging from 4 to 128. The fingers in this particular design had a length of 750 µm but interposer units with fingers with length ranging from 500 to 1500 µm have been designed and fabricated.

To enable passive alignment of the flexible optical waveguide members of the interposer unit to the on-chip optical waveguides of the PIC chip, the PIC chip includes alignment features to facilitate passive lateral, vertical and longitudinal alignment of the tips of the flexible optical waveguide members to the on-chip optical waveguides of the PIC chip. These alignment features are sometimes referred to as landing zones in this description.

Figure 2A:
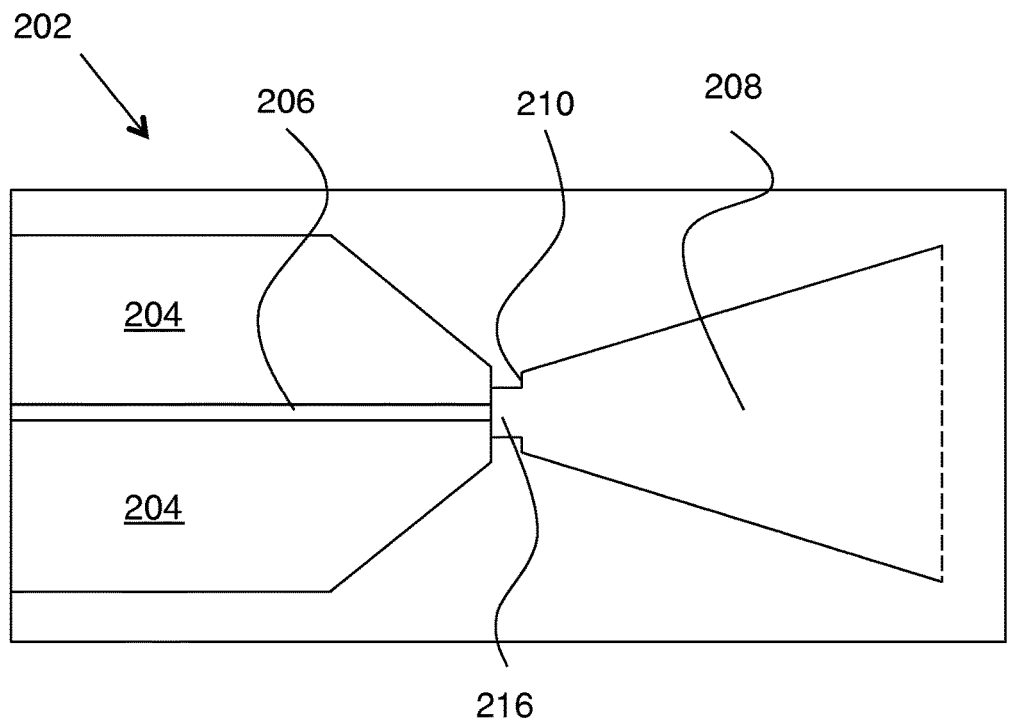
FIGS. 2A-B show detailed views of exemplary photonic integrated circuit alignment features.
Figure 2B:
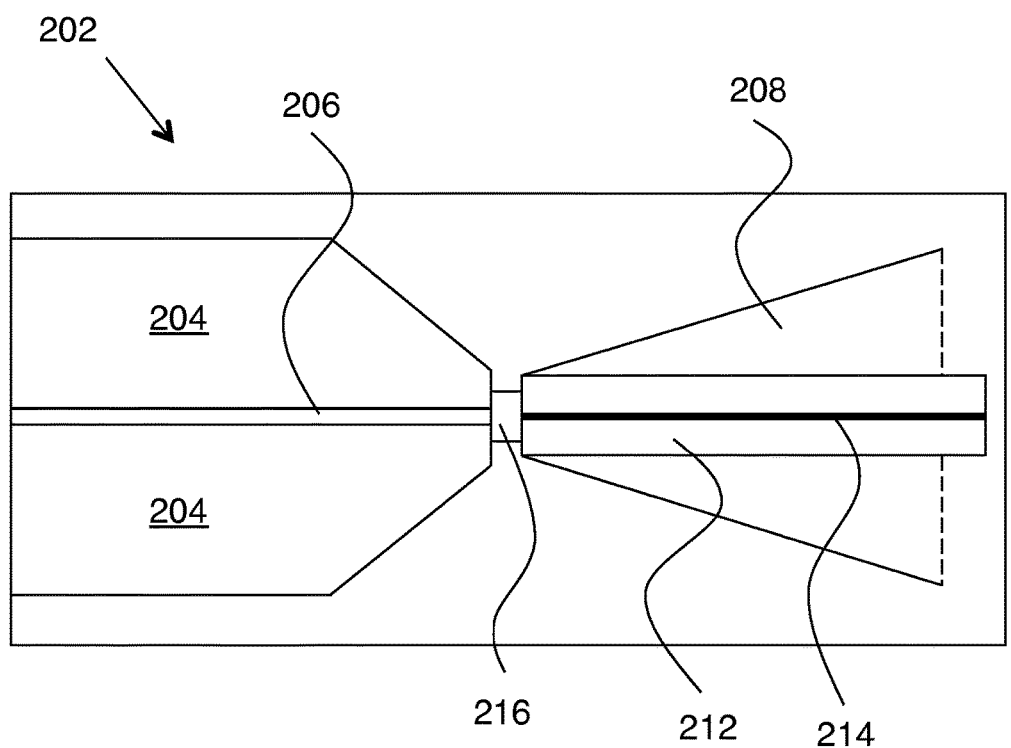

FIGS. 2A-B show examples of such alignment features. FIG. 2A shows a part of PIC chip 202 where a waveguide 206 is formed by etching a region 204 next to it. The waveguide is disposed next to a trench 208 having a lateral taper (as shown) and having a stopper section 210. Instead of waveguide 206, other on-chip structures can be used to guide the light to the face of the coupling region. FIG. 2B shows how these features work when flexible optical waveguide member 212 having optical waveguide 214 within it are mechanically engaged with these features. As shown, the effect of the lateral taper of trench 208 is to provide lateral alignment of the tip of flexible optical waveguide member 212 to the end face of the on-chip optical waveguide 206. The effect of stopper section 210 is to provide longitudinal positioning of the tip of flexible optical waveguide member 212 relative to the end face of the on-chip optical waveguide 204/206. As shown, the effect here is to provide a precisely controlled separation 216 between the on-chip waveguide 204/206 and the flexible optical waveguide member 212. In some cases, separation 216 is a free space separation. Alternatively, an index matching substance can be disposed in this region.

These alignment features and the on-chip waveguide end face can be made by etching. In front of the waveguide end face an opening 216 is made for the light to travel in free space. The width of this opening can be determined by the diffraction of the light output of the on-chip waveguide or by that of the finger. This opening, which is narrower than the flexible optical waveguide member 212 works both as z-distance control for optimizing optical coupling and to provide protection against contact with the on-chip waveguide end face. In some cases, the on-chip waveguide end faces may be mechanically sturdy enough to tolerate direct contact with the tips of the flexible optical waveguide members of the interposer unit. In such cases, stopper section 210 can be omitted. Here longitudinal positioning of the tips of the flexible optical waveguide members relative to the end faces of the on-chip optical waveguides would be provided by physical contact of the tips to the waveguide end faces.

Figure 3A:
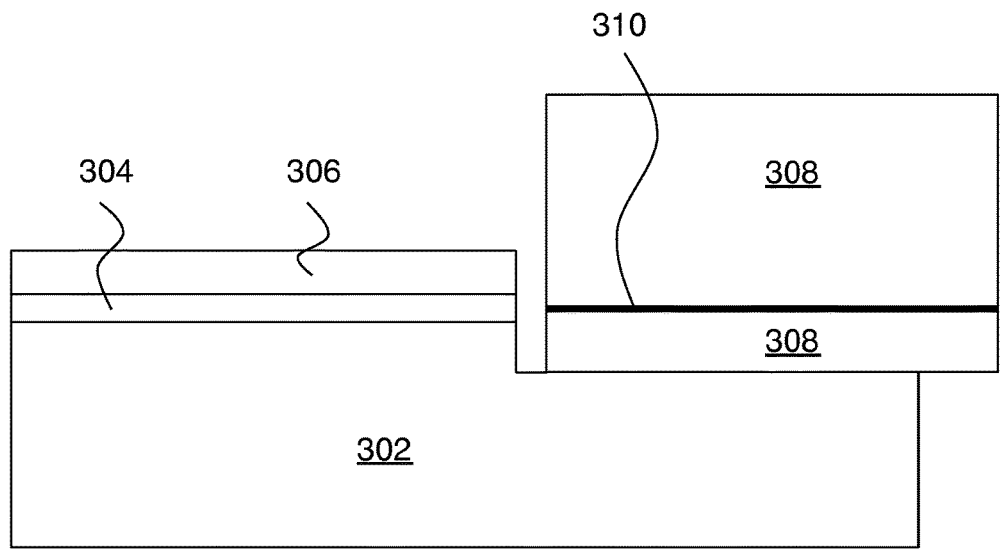
FIGS. 3A-B show further detailed views of exemplary photonic integrated circuit alignment features.
Figure 3B:
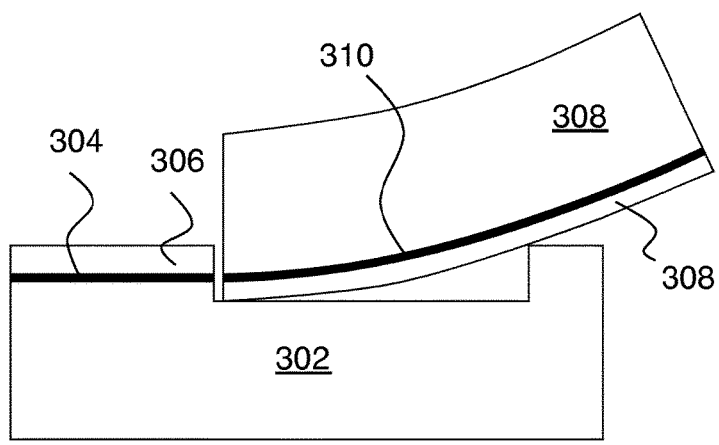

Features are also present on the PIC chip to provide vertical alignment, as seen in the side view of FIG. 3A. Here 304 is the on-chip optical waveguide of the PIC chip and is vertically sandwiched between layers 302 and 306, and flexible optical waveguide member 308 including optical waveguide 310 is disposed such that waveguide 304 and waveguide 310 are vertically aligned, as shown. The depth of trench 208 of FIGS. 2A-B can be controlled to provide this vertical alignment. This process is very accurate and can be controlled to within 50 nm (e.g., ±25 nm). FIG. 3B shows an example similar to the example of FIG. 3A. Here it is apparent that optical probing can indeed be done on any position on a wafer.

Figure 3C:
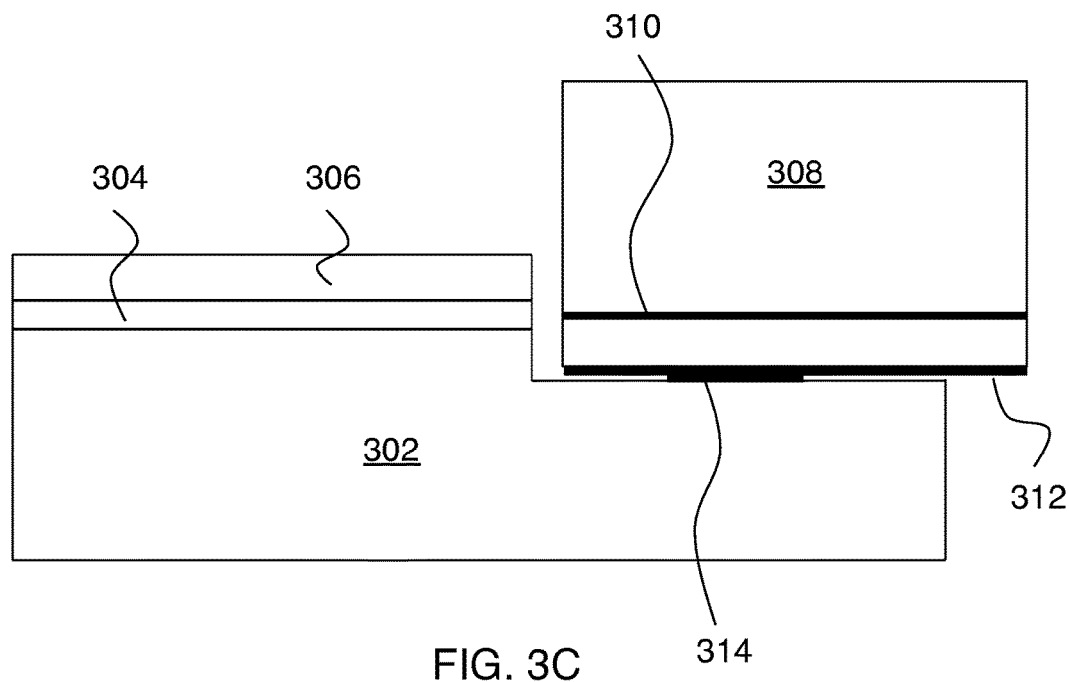
FIG. 3C shows an electrical connection being made by a flexible optical waveguide member in addition to optical coupling.

The preceding examples relate to use of an interposer unit to provide optical coupling to a PIC chip. Such interposer units can also be used to provide electrical connections in addition to optical coupling. The example of FIG. 3C is similar to the example of FIG. 3A, except that metal 312 is disposed on flexible optical waveguide member 308 to make contact with contact pad 314 of PIC chip 302, in addition to providing optical coupling as described above. Here the interposer unit includes electrical contacts for making electrical contact to the PIC chip, and these contacts are disposed on one or more of the flexible optical waveguide members. In cases where the thickness of metals 312 and 314 is significant, these thicknesses will need to be accounted for to ensure proper vertical alignment between the optical waveguide of the PIC chip and the flexible optical waveguide members.

Figure 3D:
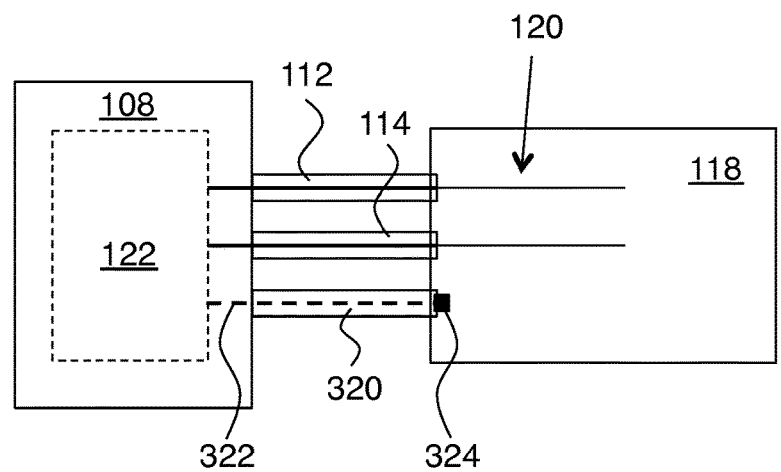
FIG. 3D shows a top view of an embodiment of the invention having an electrical connection made independently of the flexible optical waveguide members.

The example of FIG. 3D is similar to the example of FIG. 1B, except that electrical contact 322 of interposer unit 108 is connected to contact pad 324 of PIC chip 118 via flexible member 320. More than one such electrical contact can be made. Here these electrical contacts are distinct from the flexible optical waveguide members.

In cases where the interposer unit includes electrical contacts, the interposer unit can be configured to match a pitch of off-chip electrical connections to a pitch of on-chip electrical contacts of the PIC chip, analogous to optical pitch matching as shown on FIG. 1A.

Figure 4:
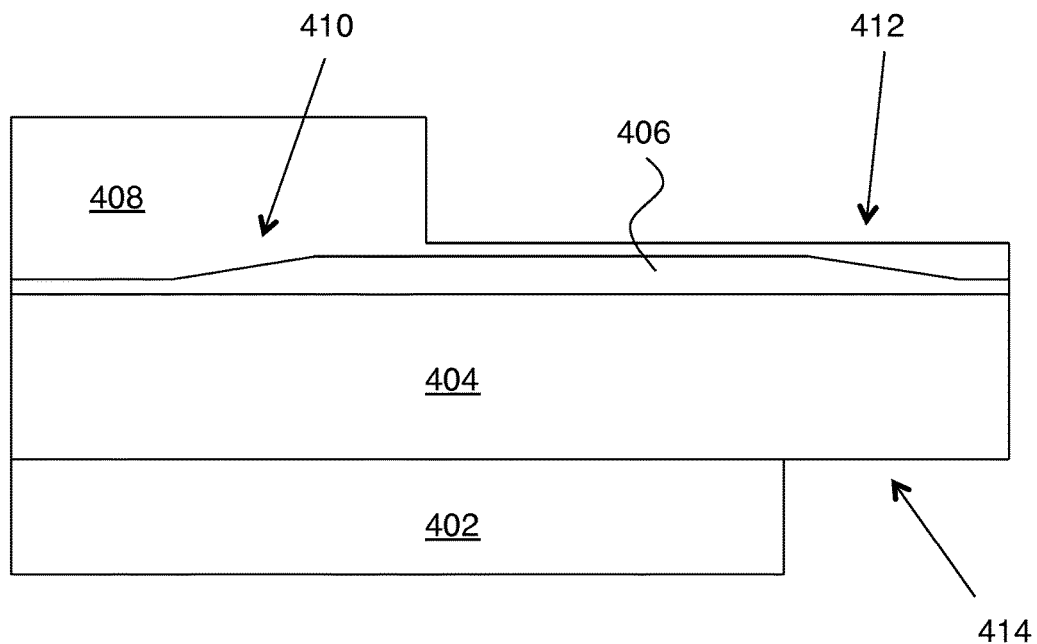
FIG. 4 shows an example of mode size control in an interposer unit.

Interposer units according to embodiments of the invention can include feature to alter the optical mode size. FIG. 4 shows an example. Here the waveguide core is 406 surrounded by cladding 404 and 408. 402 is the substrate (e.g., silicon). Going from left to right on the figure, the mode side is decreased in region 410 by increasing the thickness of core 406. This is helpful for providing optical functionality in the interposer unit, and for reducing losses to the substrate 402 in subsequent regions of the device (i.e., further to the right on the figure). In region 412, the mode size is increased to match the mode size of the flexible optical waveguide member 414 of the interposer unit to the mode size of the on-chip optical waveguides of the PIC chip. Another use for such mode matching features is to provide mode matching between a first mode size of the on-chip optical waveguides of the PIC chip and a second mode size of one or more optical fibers optically coupled to the flexible optical waveguide members. This can be used in fiber array embodiments such as the example of FIG. 1A.

Figure 5A:
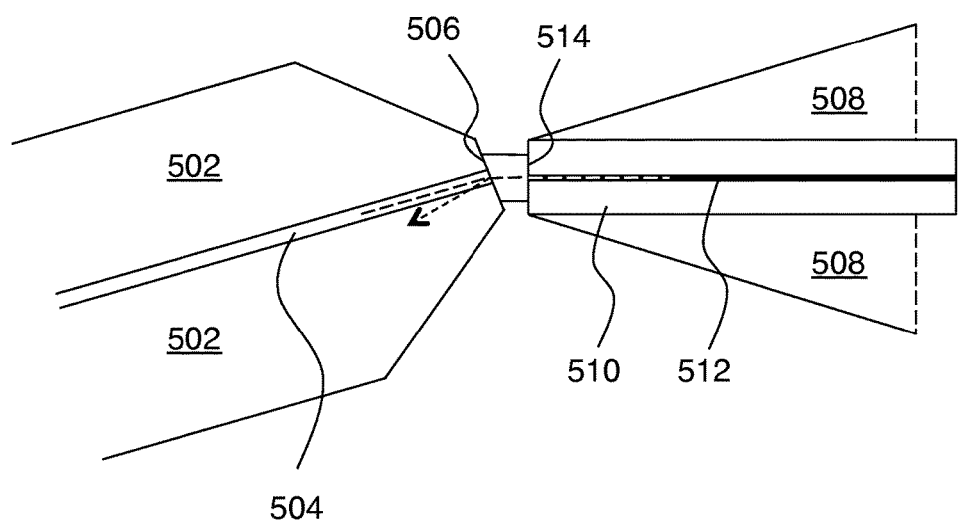
FIGS. 5A-C show several ways to reduce optical reflections in embodiments of the invention.

In preferred embodiments, back reflections are reduced in various ways. FIG. 5A shows a first example, where end face 506 of a PIC chip waveguide formed by high index region 504 surrounded by low index region 502 is angled with respect to an optical axis of the on-chip optical waveguide 502/504 to reduce the internal back-reflection (dashed arrow) in the on-chip optical waveguide. Here trench 508 is the alignment feature of the PIC chip, 510 is the flexible optical waveguide member engaged in the alignment feature, 512 is the optical waveguide in member 510, and 514 is the end face of flexible optical waveguide member 510.

Figure 5B:
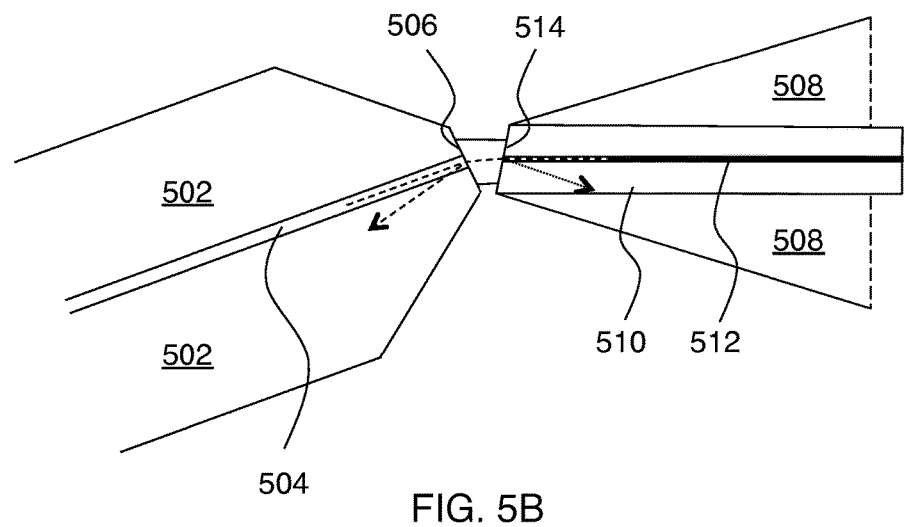

FIG. 5B shows a second example, where also end face 514 is angled with respect to an optical axis of the flexible optical waveguide member 510 to reduce the internal back-reflection in the flexible optical waveguide member (dotted arrow). In the example of FIG. 5B, both end faces are angled to reduce internal reflections.

Figure 5C:
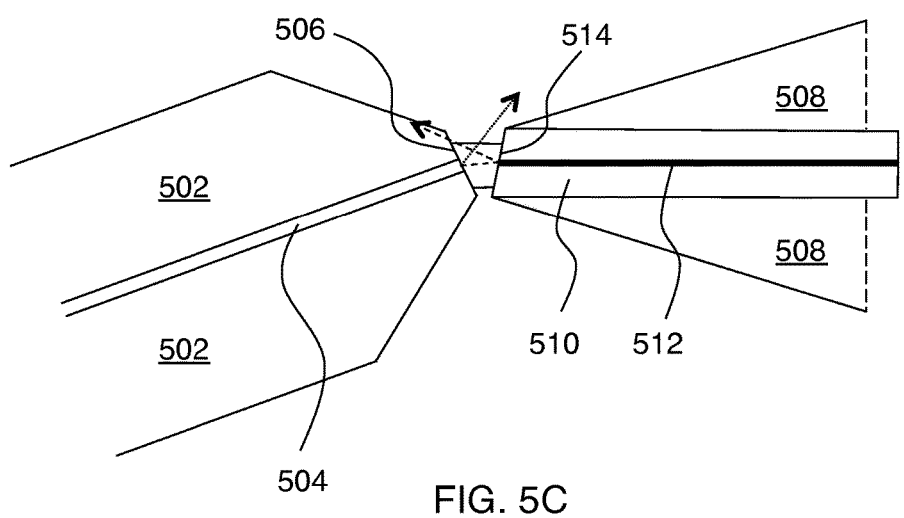

Such a configuration also serves to reduce external reflections from an end face of one of the waveguide into the other waveguide. More specifically, as shown by the dashed and dotted arrows on FIG. 5C, light reflected from end face 514 of the flexible optical waveguide member is directed away from end face 506 of the on-chip optical waveguide of the PIC, and light reflected from end face 506 of the on-chip optical waveguide is directed away from end face 514 of the flexible optical waveguide member.

These end face tilts can be configured such that transmission between the two waveguides is properly aligned, as also shown on FIG. 5B. Anti-reflection coatings (not shown on the figures to reduce clutter) can be included on the end faces of the on-chip waveguides of the PIC chip and/or the end faces of the flexible optical waveguide members in order to further reduce undesirable back-reflections. End faces can also be tilted vertically to reduce reflections, alternatively to or in combination with the above-described approaches.

Figure 6:
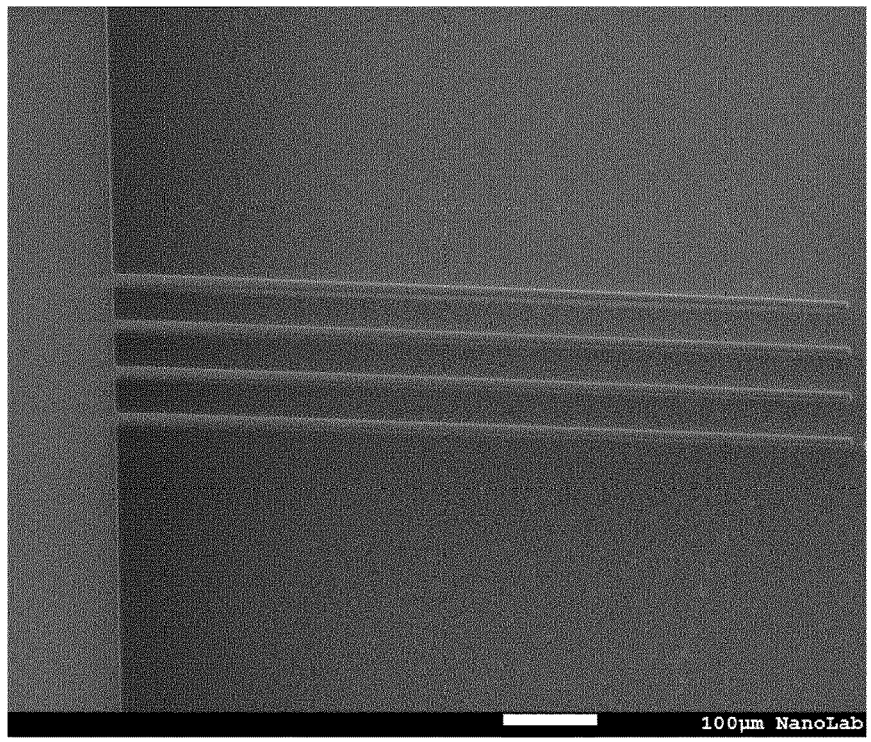
FIG. 6 is an image of fabricated flexible optical waveguide members.

FIG. 6 is a scanning electron microscope (SEM) image of 0.75 mm long flexible optical waveguide members of an interposer unit.

Figure 7:
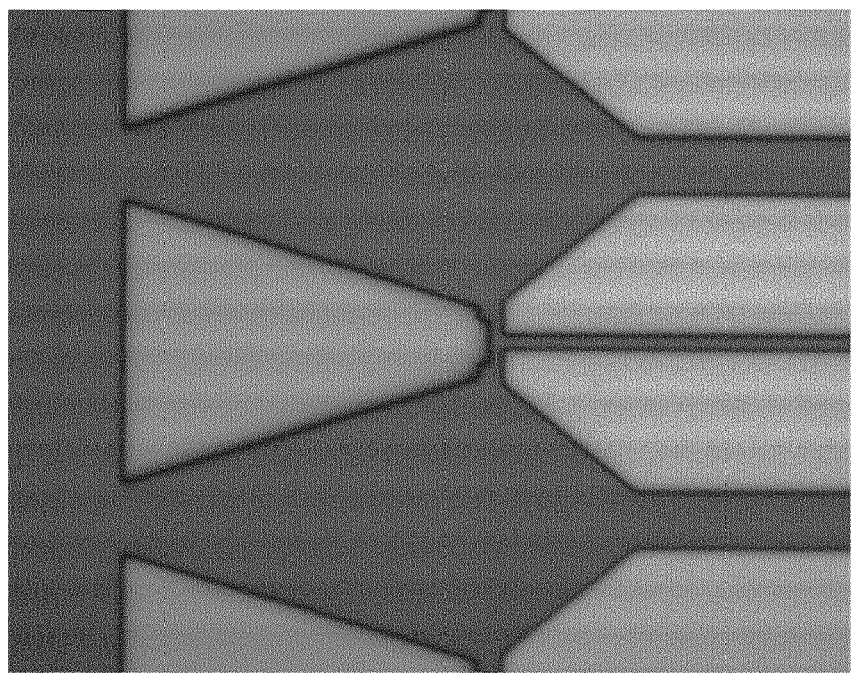
FIG. 7 is an image of fabricated alignment features on a photonic integrated circuit chip.

FIG. 7 is an image of alignment features of a photonic integrated circuit chip.

Figure 8A:
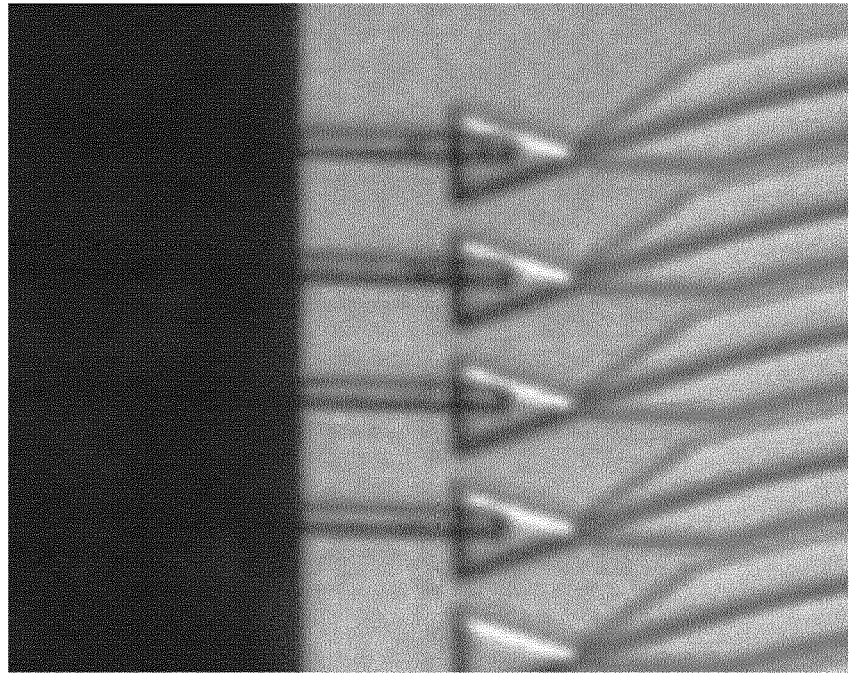
FIG. 8A is an image of fingers of the interposer unit disposed in the alignment features of the photonic integrated circuit chip.

FIG. 8A is an image of fingers of the interposer unit disposed in the alignment features of the photonic integrated circuit chip.

Figure 8B:
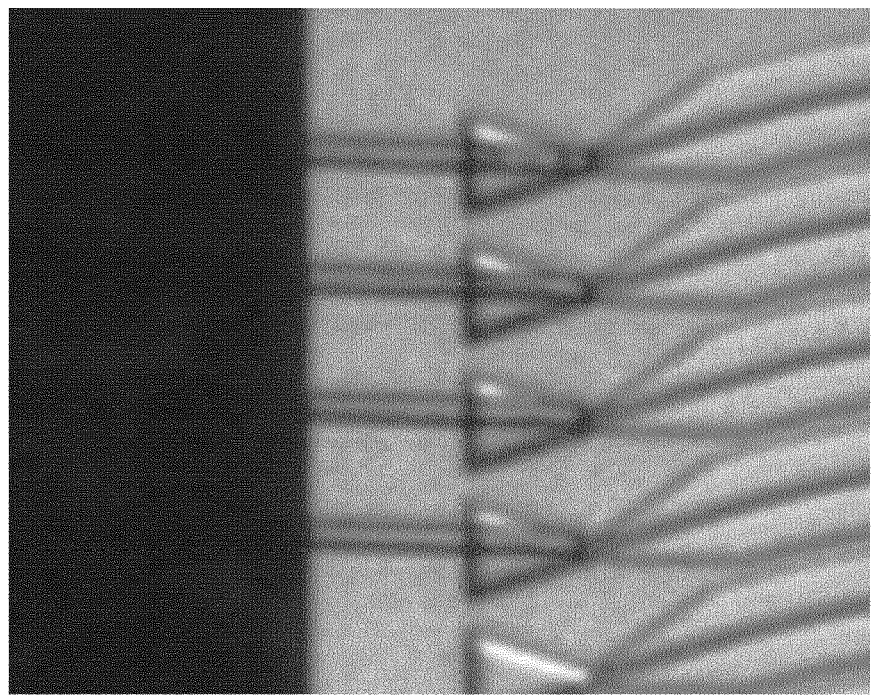
FIG. 8B is an image of fingers of the interposer unit fully engaged with the alignment features of the photonic integrated circuit chip to provide optical alignment with the on-chip waveguides of the PIC chip.

FIG. 8B is an image of fingers of the interposer unit fully engaged with the alignment features of the photonic integrated circuit chip to provide optical alignment with the on-chip waveguides of the PIC chip.

Practice of the invention does not depend critically on whether or how the flexible optical waveguide members of the interposer unit are affixed to the PIC chip. For testing, the optical connections between the tips of the flexible optical waveguide members and the PIC chip are temporary connections used for testing the PIC chip. Note that this can be done at a point in fabrication when the PIC chip is still part of a wafer including other PIC chips. Enabling such wafer-scale testing of PIC chips is a major advantage of the present approach.

In cases where permanent connections between the interposer unit and the PIC chip are desired, several alternatives can be employed. The permanent connections can be made with an adhesive such as index matching glue, glue or solder. Index matching adhesive is preferred in cases where the adhesive is in the optical path between the PIC chip and the interposer unit. If the adhesive is not disposed in this optical path, then other materials such as regular adhesive and solder can be used.

Another approach for making permanent connections is by disposing the PIC chip and the interposer unit such that the flexible optical waveguide members are in compression and remain fixed in position due to their elastic restoring forces. The can be employed in connection with the carrier bonding approach of FIG. 9B or in connection with the flip chip bonding approaches of FIGS. 9C-D.

Figure 9A:
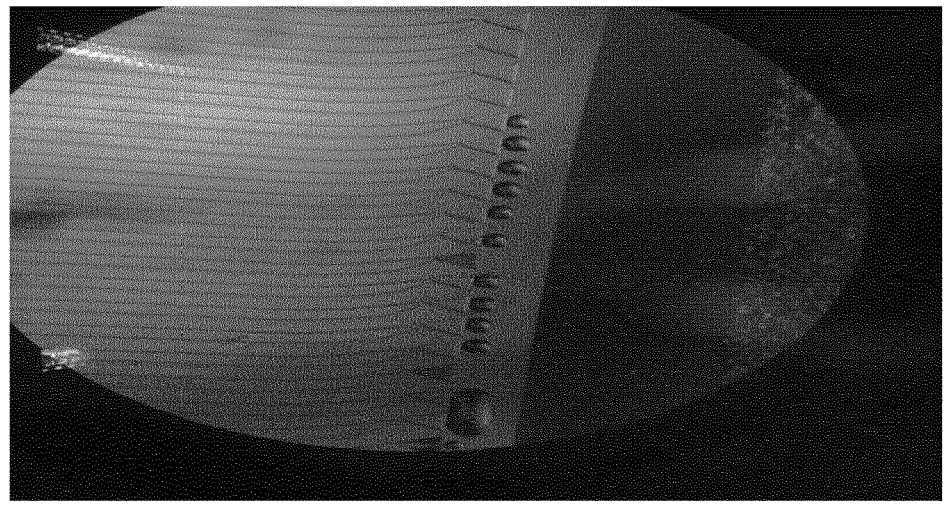
FIG. 9A is an image showing the use of glue to affix the fingers of the interposer unit to the PIC chip.

FIG. 9A is an image showing the use of glue to affix the fingers of the interposer unit to the PIC chip. The idea here is to produce small drops of glue far from the waveguide faces inside or outside of the landing zone and when the optical flexible beams are aligned, the glue is cured and fixes the fingers of the interposer unit to the PIC chip.

Figure 9B:
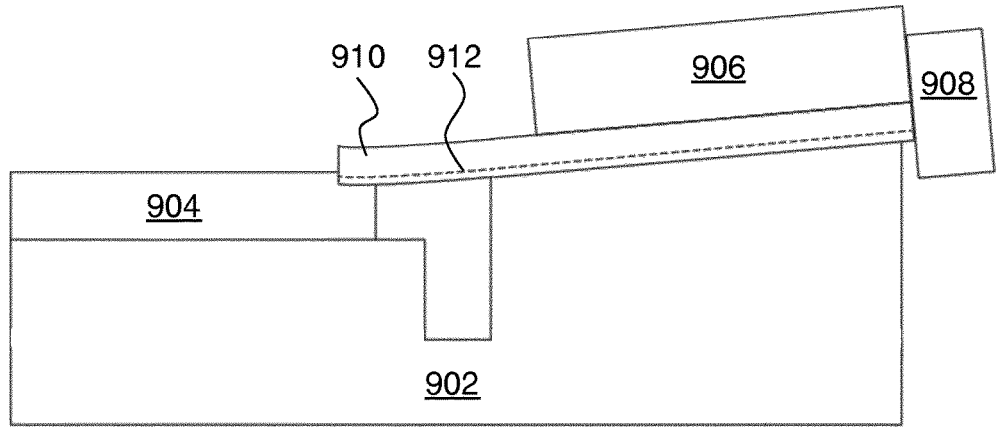
FIG. 9B shows an exemplary bonding concept for fixing the fingers of the interposer unit to the PIC chip.

FIG. 9B shows PIC chip 904 disposed on carrier 902. The interposer unit includes substrate 906 and a flexible optical waveguide member 910 including a waveguide 912. Here 908 is a fiber array unit (FAU). Since this is a side view, only a single one of the flexible optical waveguide members is shown. Here the PIC chip 902 is affixed to the carrier 902 by an adhesive such as solder, glue or epoxy. Similarly, the interposer unit is affixed to carrier 902 by an adhesive such as solder, glue or epoxy. As shown on the figure, the carrier is configured such that the flexible optical waveguide members are in compression. Thus their tips will remain in position and mechanically engaged with the alignment features of PIC chip 904 despite the lack of an adhesive bond between the tips and the alignment features.

Figure 9C:
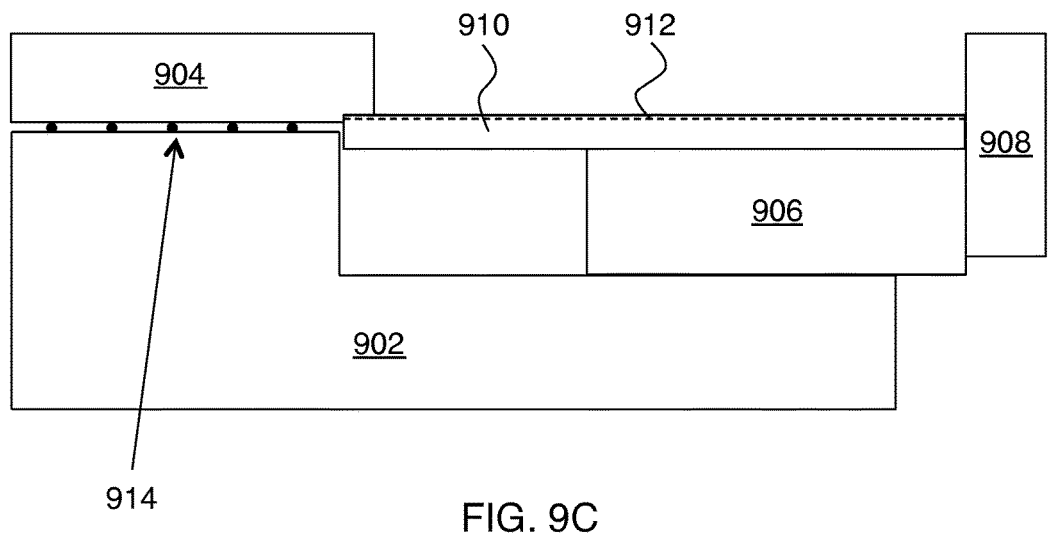
FIG. 9C shows a flip-chip bonding concept for fixing the fingers of the interposer unit to the PIC chip.

FIG. 9C shows a flip-chip bonding concept for fixing the fingers of the interposer unit to the PIC chip. In this example, 902 is a carrier, 904 is a photonic integrated circuit chip bonded to carrier 902 with flip-chip bonding 914, 906 is a substrate for the interposer unit, 910 is a flexible optical waveguide member including a waveguide 912, and 908 is a fiber array unit. Since this is a side view, only a single one of the flexible optical waveguide members is shown. Optical coupling between flexible waveguide member 910 and PIC chip 904 is according to the above-described principles.

Figure 9D:
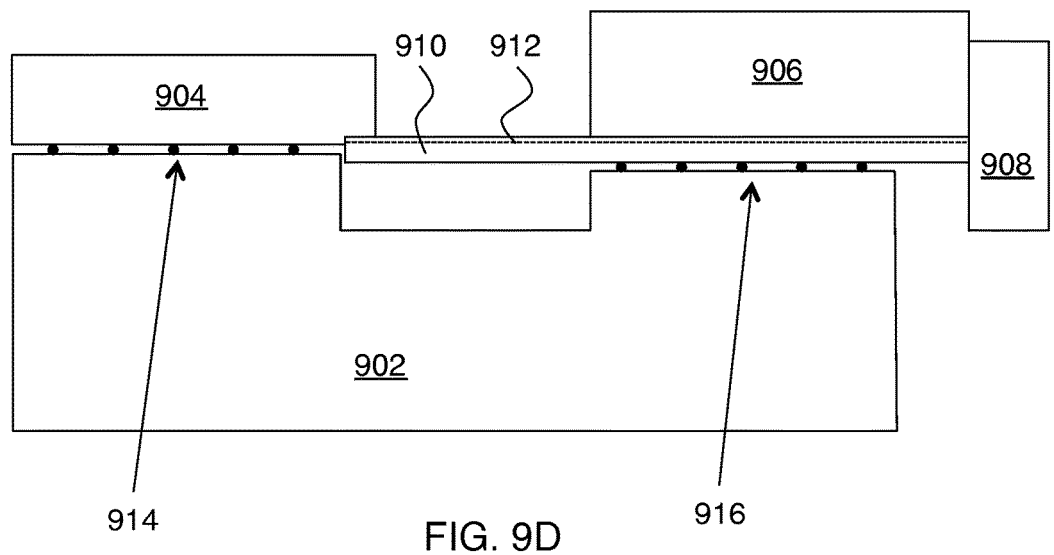
FIG. 9D shows an alternate flip-chip bonding concept for fixing the fingers of the interposer unit to the PIC chip.

FIG. 9D shows a second exemplary flip chip bonding approach. This example is similar to the example of FIG. 9C except that the interposer unit is bonded to carrier 902 with flip-chip bonding 916. Another difference between these two examples is that the reduced thickness cladding is on top of the flexible optical waveguide members in the example of FIG. 9C and is on the bottom of the flexible optical waveguide members in the example of FIG. 9D.

Experiments have been performed relating to the above-described concepts. Repeatability tests for optical connections made passively as described above were made by repeated trials and not discarding any measurement. The measured repeatability was less than 0.5 dB per coupling. For the specific finger-waveguide combination that was used, this corresponds to ±50 nm vertical position accuracy and at least ±200 nm horizontal position accuracy.

The invention claimed is:

1. Apparatus for optically coupling to a photonic integrated circuit (PIC) chip, the apparatus comprising:
   a PIC chip;
   an interposer unit configured to optically couple to the PIC chip;
   wherein the interposer unit comprises one or more flexible optical waveguide members;
   wherein the flexible optical waveguide members are configured to optically couple between the PIC chip and the interposer unit via tips of the flexible optical waveguide members; and
   wherein the PIC chip includes alignment features to facilitate passive lateral, vertical and longitudinal alignment of the tips of the flexible optical waveguide members to on-chip optical waveguides of the PIC chip;
   wherein the interposer unit further comprises electrical contacts for making electrical contact to the PIC chip.

2. The apparatus of claim 1, wherein the interposer unit is configured to match a pitch of an array of one or more optical fibers to a pitch of the on-chip optical waveguides of the PIC chip.

3. The apparatus of claim 1, wherein the interposer unit is configured to provide one or more functions selected from the group consisting of: polarization modification, optical isolation, wavelength multiplexing, wavelength demultiplexing, wavelength-selective routing, wavelength-selective switching, switching, interferometry, providing resonance with one or more ring resonators, providing optical delays, splitting and combining.

4. The apparatus of claim 1, wherein end faces of the flexible optical waveguide members are angled with respect to optical axes of the flexible optical waveguide members to reduce back-reflection in the flexible optical waveguide members.

5. The apparatus of claim 1, wherein end faces of the flexible optical waveguide members comprise anti-reflection coatings to reduce back-reflection in the flexible optical waveguide members.

6. The apparatus of claim 1, wherein end faces of the on-chip optical waveguides of the PIC chip are angled with respect to optical axes of the on-chip optical waveguides of the PIC chip to reduce back-reflection in the on-chip optical waveguides of the PIC chip.

7. The apparatus of claim 1, wherein end faces of the on-chip optical waveguides of the PIC chip comprise anti-reflection coatings to reduce back-reflection in the on-chip optical waveguides of the PIC chip.

8. The apparatus of claim 1, wherein end faces of the flexible optical waveguide members and end faces of the on-chip optical waveguides of the PIC chip are angled with respect to each other such that:
light reflected from the end faces of the flexible optical waveguide members is directed away from the end faces of the on-chip optical waveguides of the PIC chip; and
light reflected from the end faces of the on-chip optical waveguides of the PIC chip is directed away from the end faces of the flexible optical waveguide members.

9. The apparatus of claim 1, wherein one or more of the electrical contacts are disposed on one or more of the flexible optical waveguide members.

10. The apparatus of claim 1, wherein one or more of the electrical contacts are distinct from the flexible optical waveguide members.

11. The apparatus of claim 1, wherein the interposer unit is configured to match a pitch of off-chip electrical contacts to a pitch of on-chip electrical contacts of the PIC chip.

12. The apparatus of claim 1, wherein the interposer unit comprises features for mode matching between a first mode size of the on-chip optical waveguides of the PIC chip and a second mode size of one or more optical fibers optically coupled to the flexible optical waveguide members.

13. The apparatus of claim 1, wherein optical connections between the tips of the flexible optical waveguide members and the PIC chip are temporary connections used for testing the PIC chip.

14. The apparatus of claim 1, wherein optical connections between the tips of the flexible optical waveguide members and the PIC chip are permanent connections.

15. The apparatus of claim 14, wherein the permanent connections are made with an adhesive selected from the group consisting of: index matching glue, glue and solder.

16. The apparatus of claim 14, wherein the permanent connections are made by disposing the PIC chip and the interposer unit such that the flexible optical waveguide members are in compression and remain fixed in position due to their elastic restoring forces.

17. The apparatus of claim 1, wherein the alignment features comprise a trench having:
a lateral taper configured to provide lateral alignment of the tips of the flexible optical waveguide members to end faces of the on-chip optical waveguides of the PIC chip; and
a depth selected to provide vertical alignment of the tips of the flexible optical waveguide members to end faces of the on-chip optical waveguides of the PIC chip; and
a stopper section to provide longitudinal positioning of the tips of the flexible optical waveguide members relative to end faces of the on-chip optical waveguides of the PIC chip.

* * * * *